(12) United States Patent
Schinzel et al.

(10) Patent No.: US 9,893,511 B2
(45) Date of Patent: Feb. 13, 2018

(54) PROTECTIVE CIRCUIT ASSEMBLAGE FOR A MULTI-VOLTAGE ELECTRICAL SYSTEM

(71) Applicant: Robert Bosch GmbH, Stuttgart (DE)

(72) Inventors: Mirko Schinzel, Stuttgart (DE); Turgut Karacay, Weil der Stadt (DE); Juergen Haeffner, Gaertringen (DE); Nils Draese, Feuerbach (DE); Ulf Pischke, Stuttgart (DE); Sebastian Walenta, Stuttgart (DE); Gabriel Wetzel, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 408 days.

(21) Appl. No.: 14/435,606

(22) PCT Filed: Sep. 20, 2013

(86) PCT No.: PCT/EP2013/069632
§ 371 (c)(1),
(2) Date: Apr. 14, 2015

(87) PCT Pub. No.: WO2014/060181
PCT Pub. Date: Apr. 24, 2014

(65) Prior Publication Data
US 2015/0288169 A1    Oct. 8, 2015

(30) Foreign Application Priority Data
Oct. 17, 2012    (DE) ........................ 10 2012 218 914

(51) Int. Cl.
*H02H 7/00*    (2006.01)
*H02H 7/12*    (2006.01)
(Continued)

(52) U.S. Cl.
CPC ............ *H02H 7/1213* (2013.01); *H02M 1/32* (2013.01); *H02M 3/158* (2013.01)

(58) Field of Classification Search
CPC .................................................... H02H 7/1213
(Continued)

(56) References Cited

U.S. PATENT DOCUMENTS 5,986,902 A    11/1999    Brkovic et al.
6,151,222 A *    11/2000    Barrett .................. H02M 3/337
                                                         363/16
(Continued)

FOREIGN PATENT DOCUMENTS

CN            101212173 A        7/2008
DE    10 2008 041 341        2/2010
(Continued)

OTHER PUBLICATIONS

International Search Report for PCT/EP2013/069632, dated Dec. 10, 2013.

*Primary Examiner* — Stephen W Jackson
(74) *Attorney, Agent, or Firm* — Norton Rose Fulbright US LLP; Gerard Messina

(57) ABSTRACT

A protective circuit assemblage for a multi-voltage electrical system includes: a DC voltage converter provided in the region of the transition between a high-voltage loop and a low-voltage loop; and at least one switch respectively provided in each of the high-voltage loop and the low-voltage loop.

5 Claims, 5 Drawing Sheets

(51) Int. Cl.
*H02M 1/32* (2007.01)
*H02M 3/158* (2006.01)

(58) Field of Classification Search
USPC .......................................................... 361/78
See application file for complete search history.

(56) References Cited

U.S. PATENT DOCUMENTS

| | | | |
|---|---|---|---|
| 6,275,958 B1 | 8/2001 | Carpenter et al. | |
| 6,320,358 B2 * | 11/2001 | Miller .................. | H02J 7/1423 307/10.1 |
| 6,437,462 B1 | 8/2002 | Maple et al. | |
| 7,405,495 B2 * | 7/2008 | Guillarme ............... | H02M 1/32 307/44 |
| 8,830,643 B2 * | 9/2014 | Gronwald ............. | B60L 3/0069 361/84 |

FOREIGN PATENT DOCUMENTS

| | | |
|---|---|---|
| EP | 1318529 A2 | 6/2003 |
| EP | 1 548 921 | 6/2005 |
| WO | WO 2013/102879 | 7/2013 |

* cited by examiner

PROTECTIVE CIRCUIT ASSEMBLAGE FOR A MULTI-VOLTAGE ELECTRICAL SYSTEM

BACKGROUND OF THE INVENTION

1. Field of the Invention

The present invention relates to a protective circuit assemblage for a multi-voltage electrical system, for example in a motor vehicle, in order to exercise control over internal and optionally external faults, in particular short circuits and polarity reversals. The protective circuit assemblage can be both at least in part a constituent of a DC voltage converter, and provided separately in the multi-voltage electrical system.

2. Description of the Related Art

DC voltage converters are used to convert different voltages. "DC voltage converter" usually refers to an electrical circuit or electrical component that converts a DC voltage delivered at the input into a different DC voltage.

DC voltage converters are utilized, for example, in so-called "multi-voltage" electrical systems, in which an input voltage that is primary-side in terms of the converter is converted into a comparatively high or low secondary-side output voltage. The term "multi-voltage electrical system" refers to electrical networks having multiple loops that are operated with different electrical voltages. In the context of interaction of the different loops, it is necessary to convert the electrical voltage between them.

Multi-voltage electrical systems are used in motor vehicles as electrical power supply systems that, in addition to low-voltage loads that are usually set to a DC voltage of 12 V, also work with at least one high-power load set e.g. to 48 V. The multi-voltage electrical system has for this purpose a corresponding high-power generator and/or a corresponding high-power battery, as well as a DC voltage converter that converts the DC voltage of, for example, 48 V into a 12 V voltage at approximately the same power level. Typically the multi-voltage electrical system of a motor vehicle usually also has a low-voltage battery, for example a 12 V battery.

DC voltage converters are used in motor vehicles, for example, in a low-voltage hybrid system. In this application, the DC voltage converter transfers energy between the 48 V and 12 V vehicle electrical systems. The 48 V vehicle electrical system represents a high-voltage loop, and the 12 V vehicle electrical system represents a low-voltage loop. A DC voltage converter of this kind is referred to as a "power conversion unit for boost recuperation system" (PCU-BRS).

One challenge to this converter is that of protecting the 12 V vehicle electrical system. This must be ensured even in the event of a short circuit from the high-voltage side to ground, and failure of the half bridges.

It is known to provide a breaker, for example a semiconductor switch, on the 12 V side for such a protective circuit.

The published German patent application document DE 10 2008 041 341 A1 discloses a DC voltage converter that is utilized in an electrical system of a motor vehicle. In the DC voltage converter described, the external ground potential is separated from an internal ground potential node when the DC voltage converter is in the switched-off state. Parasitic current flows are thereby largely avoided.

BRIEF SUMMARY OF THE INVENTION

It is proposed to provide at least one switch both on the low-voltage side or in the low-voltage loop, and on the high-voltage side or in the high-voltage loop. Hitherto a circuit has been provided on the low-voltage side. In order to offer optimum protection, in an embodiment the switch on the high-voltage side is designed with different triggering conditions than the switch on the low-voltage side.

As a result of this economical but also very effective approach, galvanically nonisolated DC voltage converters become interesting. Optimum protection, almost comparable to that with galvanically isolated converters, is available at lower cost.

The protective circuit assemblage presented is utilized, for example, in a motor vehicle, in particular in a regeneration system in the motor vehicle. This serves to recover energy, and results in a reduction in exhaust gases. It is noteworthy that in the motor vehicle, the voltage on the low-voltage side is ordinarily in a range from 9 to 16 V. The voltage on the high-voltage side can be up to 600 V. Such high voltages are required, for example, in hybrid vehicles.

It is also possible to provide, on each of the two sides, two switches which usually block in different directions. Usually the first of the two switches protects against internal faults, i.e. malfunctions in the DC voltage converter, and the second switch protects against external faults, for example polarity reversal or a short circuit.

It is further noteworthy that switches are usually constituted by a number of parallel transistors, e.g. MOSFET transistors, so that large currents can in this manner be efficiently conveyed and reliably switched off.

Further advantages and embodiments of the invention are evident from the description and from the appended drawings.

It is understood that the features recited above and those yet to be explained below are usable not only in the respective combination indicated, but also in other combinations or in isolation, without departing from the scope of the present invention.

DETAILED DESCRIPTION OF THE INVENTION

Figure 1:
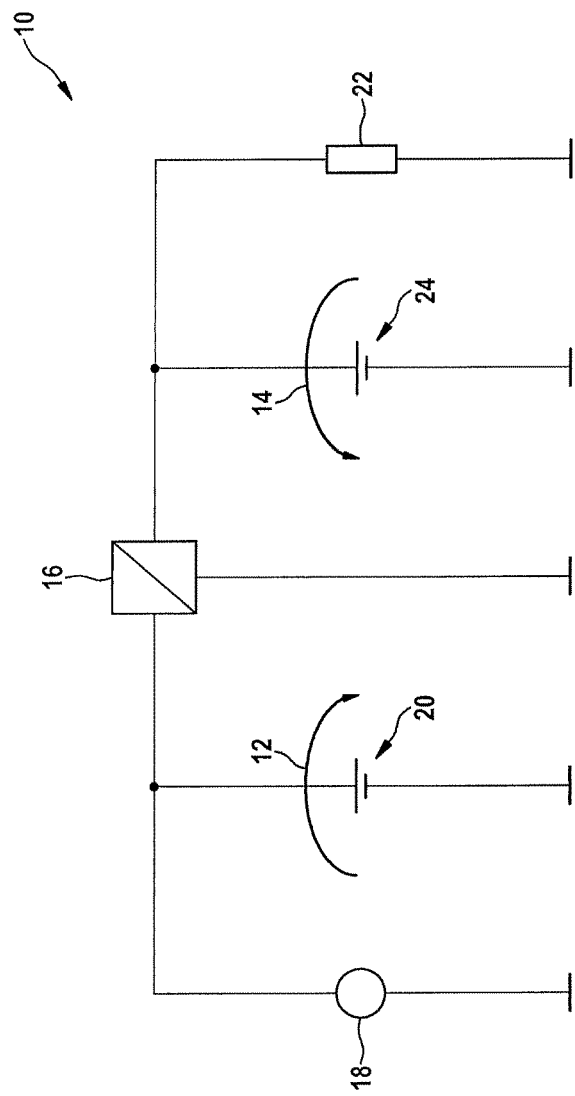
FIG. 1 shows an embodiment of a multi-voltage electrical system.

The invention is schematically depicted in the drawings on the basis of embodiments, and will be described in detail below with reference to the drawings.

FIG. 1 shows an embodiment of a multi-voltage electrical system that is labeled in its entirety with the reference number 10. This multi-voltage electrical system encompasses a high-voltage loop 12 and a low-voltage loop 14, between which a DC voltage converter 16 is inserted. The latter converts the voltage between the two loops 12 and 14. In addition, a load 18 and a source 20 are provided in high-voltage loop 12. Low-voltage loop 14 encompasses a load 22 and a source 24. In principle, a load or an energy source, for example a battery, can be provided in each of the two loops 12 and 14.

A fault in DC voltage converter 16 results in a malfunction of the entire multi-voltage electrical system 10. In the context of use in a motor vehicle, this can result in failure of a specific function, and thus in safety-critical driving conditions. It is therefore necessary to ensure that faults in DC voltage converter 16, i.e. internal faults, and preferably also external faults such as a short circuit or a polarity reversal in multi-voltage electrical system 10, can be detected and measures can be taken promptly to ensure ongoing safe operation of the motor vehicle.

Figure 2:
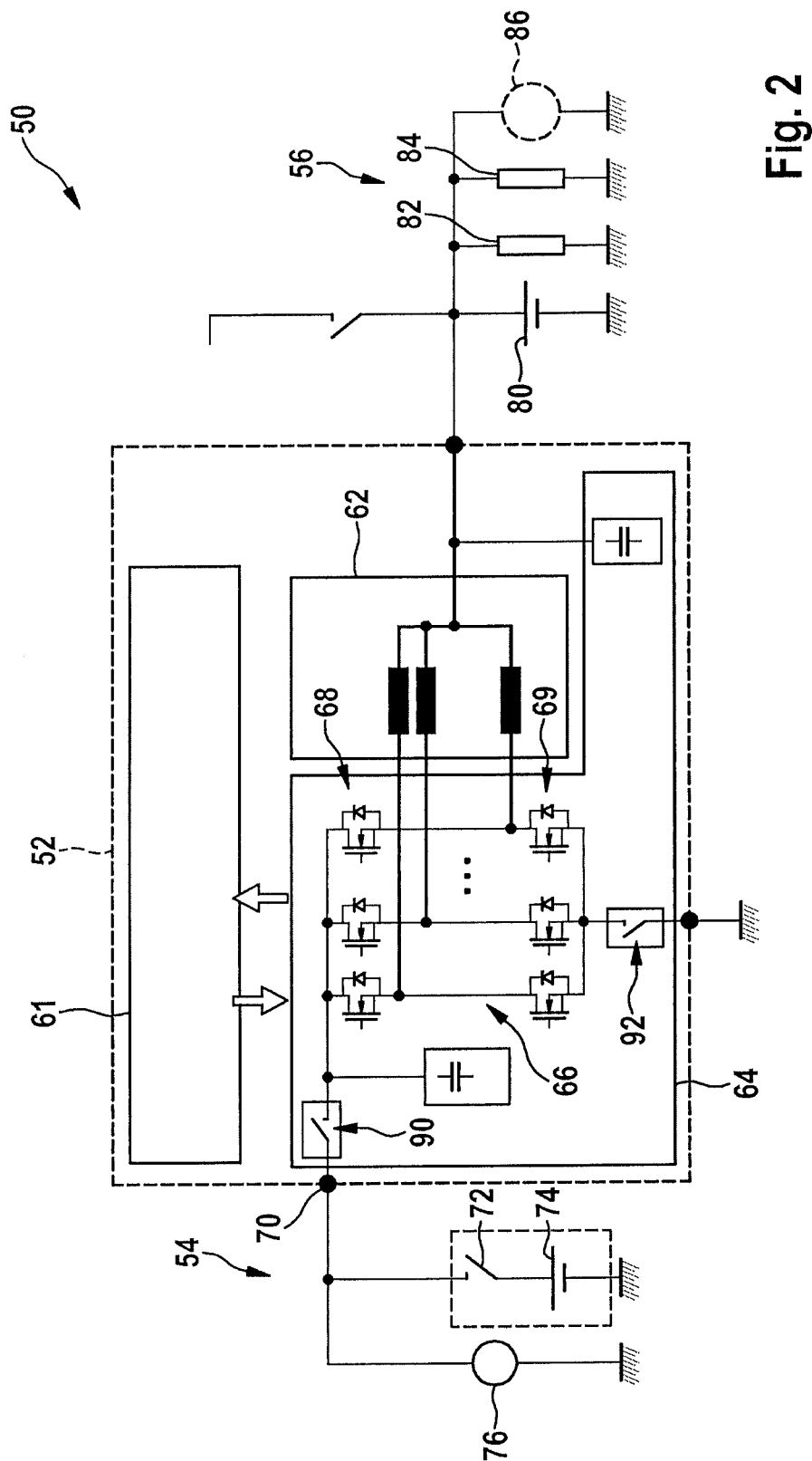
FIG. 2 shows an embodiment of the circuit assemblage described, in a multi-voltage electrical system.

FIG. 2 depicts an embodiment of the protective circuit assemblage, labeled in its entirety with the reference number 50. This circuit assemblage 50 encompasses a DC voltage converter 52 that is provided in the region between a high-voltage loop 54 and a low-voltage loop 56, i.e. in this embodiment, DC voltage converter 52 encompasses respective parts of both loops 54 and 56.

The DC voltage converter has a microcontroller 61 as a control system, a module having circuit inductances 62, and a power section or switching section 64. A number of branches 66 corresponding to the number of phases is provided in power section 64. Each phase is made up of a half-bridge each having two transistors or switches, with an upper half-bridge 68 and a lower half-bridge 69. On the high-voltage side, a switch 72 having a source 74, and parallel thereto a motor 76, are provided at terminal 60 (reference number 70). A source 80, a first load 82, a second load 84, and an additional load 86 are connected in parallel with one another in low-voltage loop 56.

In DC voltage converter 52, a first switch 90 is provided in high-voltage loop 54, and a second switch 92 is provided in the ground path and thus in low-voltage loop 56.

Different faults can be appropriately reacted to using the two switches 90 and 92. First switch 90 is opened in response to a short circuit between high voltage and ground, for example externally in the wiring harness or internally in the circuit itself.

Second switch 92 is opened if a short circuit exists between low voltage and ground, for example externally in the wiring harness or internally in the circuit itself.

A short circuit between high voltage and low voltage can be caused externally by a short circuit in the wiring harness. No countermeasure is necessary in this case. If this short circuit is produced by an internal short circuit, then switches 90 and 92 are opened.

Figure 3:
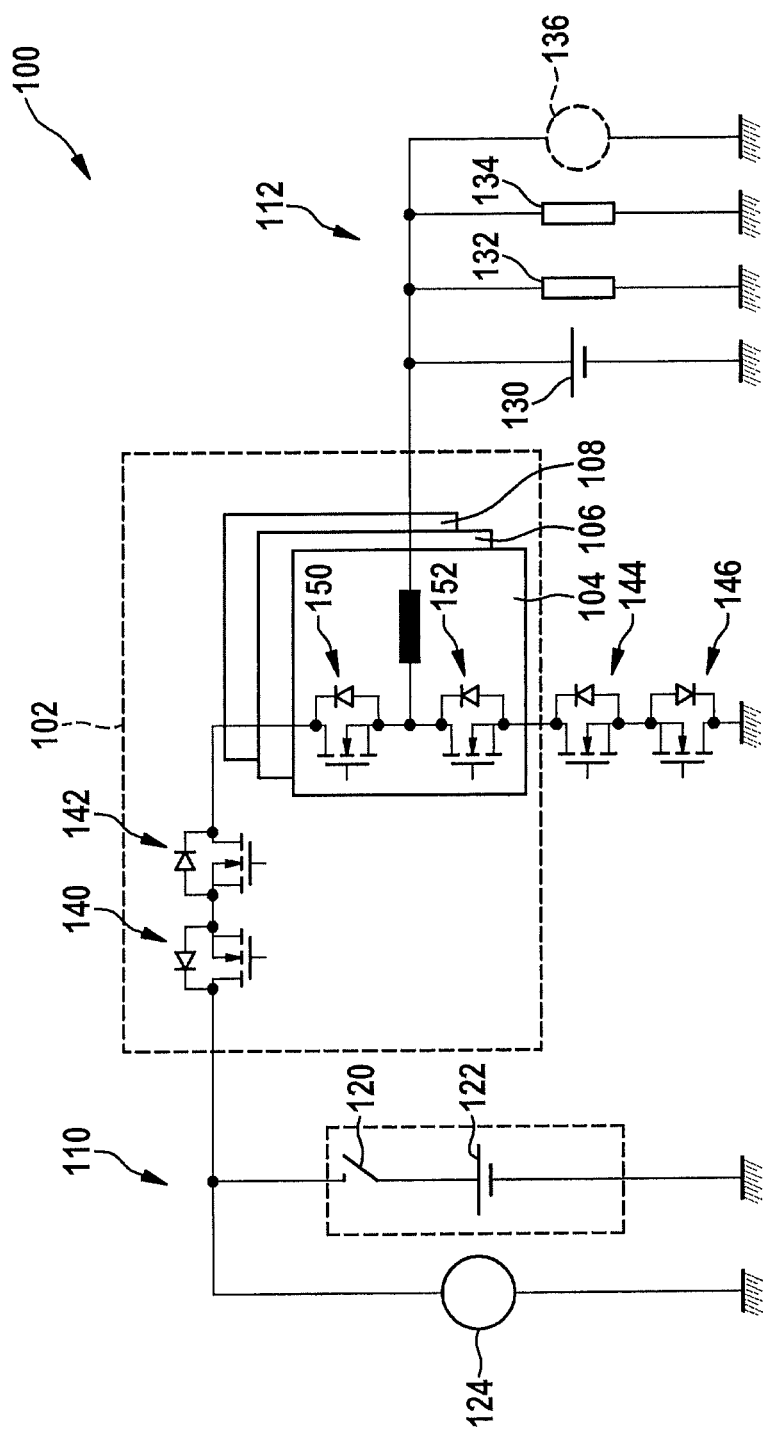
FIG. 3 shows a further embodiment of the circuit assemblage described, in a multi-voltage electrical system.

FIG. 3 shows a further embodiment of circuit assemblage 100 having a DC voltage converter 102 having a first phase 104, a second phase 106, and a third phase 108. This DC voltage converter 102 is disposed between a high-voltage loop 110 and a low-voltage loop 112, parts of the two loops 110 and 112 being integrated into DC voltage converter 102.

The high-voltage loop encompasses, inter alia, a switch 120 and a source 122 in series, which are connected in parallel with an electrical machine 124. A source 130, a first load 132, a second load 134, and a further load 136, for example of electrical machine 124, are disposed in parallel with one another in low-voltage loop 112.

A first switch 140 and a second switch 142 are disposed in DC voltage converter 102 on the high-voltage side and thus in high-voltage loop 110. This "back-to-back" (B2B) configuration is constituted by two oppositely disposed MOSFETs. A third switch 144 and a fourth switch 146, which constitute a second B2B, are provided outside DC voltage converter 102 in the ground path and thus in low-voltage loop 112.

First switch 140 protects in the context of an internal fault, for example a failure of the upper half-bridge switch 150 of DC voltage converter 102. Second switch 142 protects in the context of an external short circuit or polarity reversal in high-voltage loop 110.

Third switch 144 protects in the context of internal faults, for example a failure of the lower half-bridge switch 152. Fourth switch 146 protects in the context of an external polarity reversal in low-voltage loop 112 and thus on the low-voltage side.

The embodiment shown in FIG. 3 is technically simple to implement. It also makes possible a reduction in quiescent current.

Figure 4:
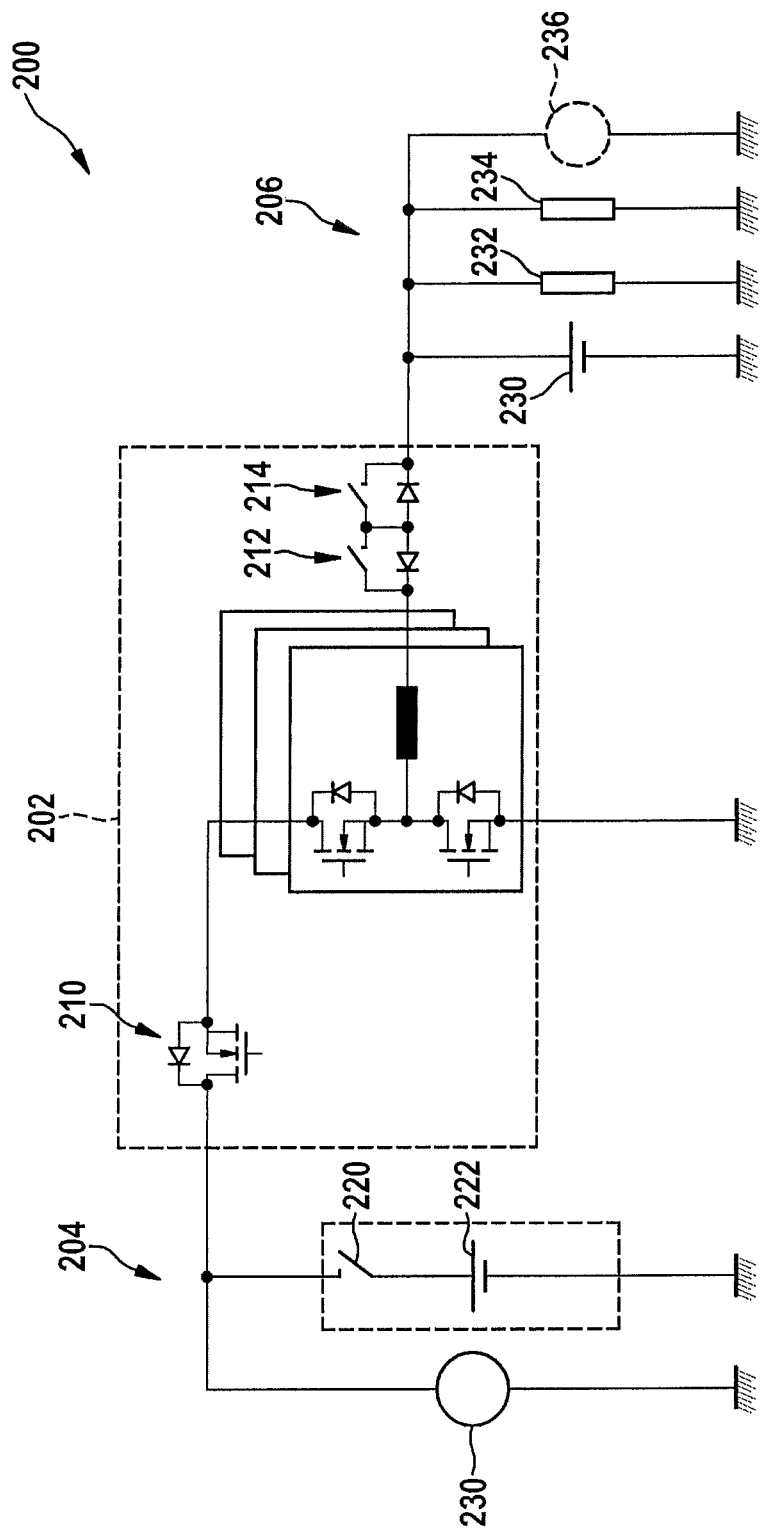
FIG. 4 shows yet another embodiment of the circuit assemblage described, in a multi-voltage electrical system.

FIG. 4 shows yet another embodiment of circuit arrangement 200, having a DC voltage converter 202 between a high-voltage loop 204 and a low-voltage loop 206. Here only one switch 210 is provided in the DC voltage converter in high-voltage loop 204. The second switch can be omitted if there is no need to react to a polarity reversal of the high-voltage loop, for example because that can be ruled out by way of external measures.

Also provided in DC voltage converter 202 on the low-voltage side, i.e. in low-voltage loop 206, are a second switch 212 and a third switch 214 (B2B). These are provided, however, not in the ground connection but in the potential connection of the low-voltage loop.

High-voltage loop 204 encompasses, inter alia, a switch 220 in series with a source 222. An electrical machine 224 is provided in parallel with them. Also provided in low-voltage loop 206 are a source 230, a first load 232, a second load 234, and an additional load 236.

The embodiment shown in FIG. 4 is once again technically each to implement. With this as well, a reduction in quiescent current is possible.

Figure 5:
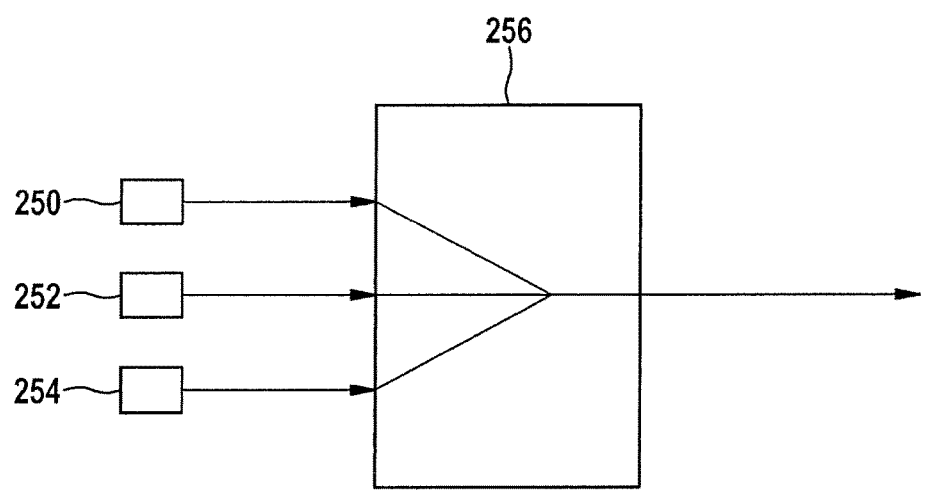
FIG. 5 is a schematic depiction illustrating various triggering conditions.

FIG. 5 depicts triggering conditions. The depiction shows a comparator 250, in this case a hardware comparator; a microcontroller 252; and a watchdog 254, in this case a hardware watchdog. Also depicted is a logic element 256, in this case an OR element.

With this embodiment the switches are intended to have the following triggering conditions:

Comparator 250 ascertains an excessively high output current.

Microcontroller 252 ascertains a malfunction.

Watchdog 254 ascertains a malfunction of microcontroller 252.

Hardware comparator 250 compares an output variable, for example the output current or output voltage, with a maximum limit value. Microcontroller 252 has a monitoring function for the output current. This monitoring function is more accurate than hardware comparator 250, but slower.

Hardware watchdog 254 ensures that microcontroller 252 is operating correctly, i.e. that the microcontroller monitoring function, which is intended to open the associated switch as required, is being performed correctly.

If one of the three conditions is met, the associated breakers are to be opened immediately.

Microcontroller 250 can in principle monitor operating conditions.

What is claimed is:

1. A protective circuit assemblage for a multi-voltage electrical system, comprising:
   a DC voltage converter provided in a region of a transition between a high-voltage loop and a low-voltage loop;
   at least one first switch provided in the high-voltage loop;
   at least one second switch provided in the low-voltage loop;
   a third switch in the high-voltage loop and which protects against polarity reversal in the high-voltage loop; and a fourth switch in the low-voltage loop and which protects against polarity reversal in the low-voltage loop;

wherein the at least one first switch of the high-voltage loop is in the DC voltage converter, wherein the at least one second switch of the low-voltage loop is in the DC voltage converter, and wherein the first switch, the second switch, the third switch and the fourth switch are configured to be opened in the presence of at least one triggering condition.

2. The protective circuit assemblage as recited in claim 1, wherein a comparator checks a first specified triggering condition by comparing an output variable with a limit value.

3. The protective circuit assemblage as recited in claim 2, wherein a monitoring function in a microcontroller checks a second specified triggering condition.

4. The protective circuit assemblage as recited in claim 3, wherein a watchdog checks a third specified triggering condition, wherein the third specified triggering condition is a presence of an incorrect functionality of the monitoring function of the microcontroller.

5. The protective circuit assemblage as recited in claim 4, wherein the first switch, the second switch, the third switch and the fourth switch each include at least one MOSFET transistor.

* * * * *